(12) United States Patent
Moon et al.

(10) Patent No.: US 8,822,832 B2
(45) Date of Patent: Sep. 2, 2014

(54) EPOXY RESIN COMPOSITION FOR PRINTED CIRCUIT BOARD, INSULATING FILM, PREPREG, AND MULTILAYER PRINTED CIRCUIT BOARD

(71) Applicant: Samsung Electro-Mechanics Co., Ltd., Suwon (KR)

(72) Inventors: Jin Seok Moon, Suwon (KR); Seong Hyun Yoo, Suwon (KR); Keun Yong Lee, Suwon (KR); Hyun Jun Lee, Suwon (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/780,988

(22) Filed: Feb. 28, 2013

(65) Prior Publication Data

US 2014/0077129 A1   Mar. 20, 2014

(30) Foreign Application Priority Data

Sep. 19, 2012   (KR) .......................... 10-2012-0104042

(51) Int. Cl.
| | |
|---|---|
| *H01B 3/40* | (2006.01) |
| *H05K 1/00* | (2006.01) |
| *C08L 63/00* | (2006.01) |
| *C09K 19/38* | (2006.01) |
| *C09K 19/54* | (2006.01) |
| *B32B 27/38* | (2006.01) |

(52) U.S. Cl.
USPC ........ 174/255; 174/110 E; 174/258; 523/433; 523/435; 523/451; 252/299.01; 252/299.5; 428/413; 428/901

(58) Field of Classification Search
USPC ................. 252/299.01, 299.5, 299.6, 299.61, 252/299.62, 299.67, 299.63; 428/413, 901; 174/258, 110 E, 255; 523/427, 435, 523/433, 451
See application file for complete search history.

(56) References Cited

U.S. PATENT DOCUMENTS

| | | | |
|---|---|---|---|
| 2013/0337268 A1* | 12/2013 | Jeon et al. ..................... | 428/413 |
| 2014/0002226 A1* | 1/2014 | Moon et al. ................... | 336/200 |

FOREIGN PATENT DOCUMENTS

KR    1020110108198    10/2011

\* cited by examiner

*Primary Examiner* — Shean C Wu
(74) *Attorney, Agent, or Firm* — Ladas & Parry, LLP

(57) ABSTRACT

Disclosed herein are an epoxy resin composition for a printed circuit board, an insulating film, a prepreg, and a multilayer printed circuit board, the epoxy resin composition for a printed circuit board including a liquid crystal oligomer, an epoxy resin, an amino triazine novolac hardener, and an inorganic filler; the insulating film and the prepreg each being manufactured by using the resin composition; and the multilayer printed circuit board including the insulating film or the prepreg.

21 Claims, 1 Drawing Sheet

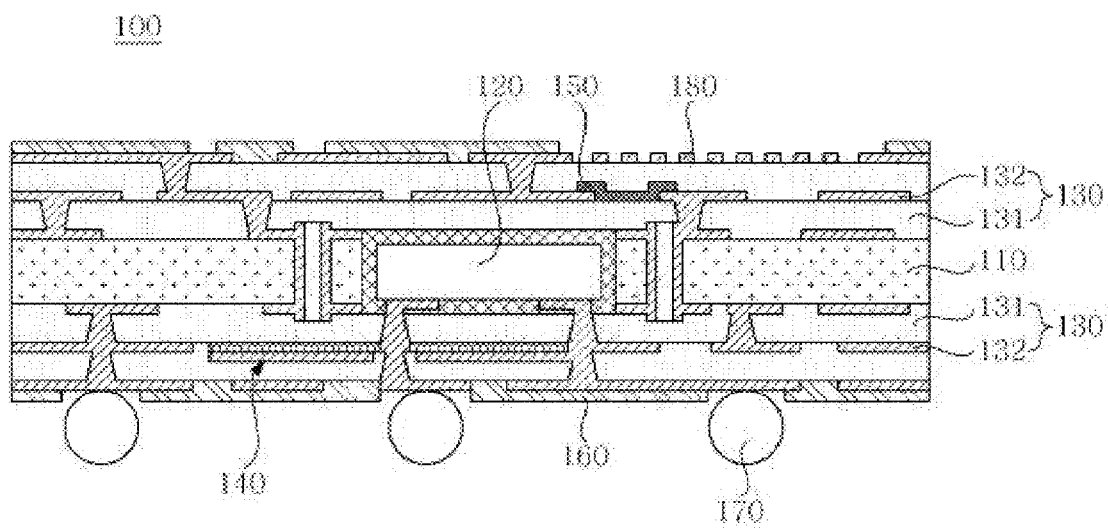

EPOXY RESIN COMPOSITION FOR PRINTED CIRCUIT BOARD, INSULATING FILM, PREPREG, AND MULTILAYER PRINTED CIRCUIT BOARD

CROSS REFERENCE TO RELATED APPLICATION

This application claims the benefit of Korean Patent Application No. 10-2012-0104042, filed on Sep. 19, 2012, entitled "Epoxy Resin Composition for Printed Circuit Board, Insulating Film, Prepreg, and Multilayer Printed Circuit Board", which is hereby incorporated by reference in its entirety into this application.

BACKGROUND OF THE INVENTION

1. Technical Field

The present invention relates to an epoxy resin composition for a printed circuit board, an insulating film, a prepreg, and a multilayer printed circuit board.

2. Description of the Related Art

With the development of electronic devices and request for complicated functions, a printed circuit board has continuously been requested to have a low weight, a thin thickness, and a small size day by day. In order to satisfy these requests, wirings of the printed circuit board becomes more complex, further densified, and higher functioned. In addition, in the printed circuit board, a buildup layer is multilayered, and thus miniature and high densification of wirings are requested. These electrical, thermal, and mechanical characteristics requested for the printed circuit board act as more important factors.

The printed circuit board is mainly composed of copper for circuit wirings and polymer for interlayer insulation. As compared with copper, the polymer constituting an insulating layer requests several characteristics such as coefficient of thermal expansion, glass transition temperature, thickness uniformity, and the like. Particularly, the insulating layer needs to be formed to have a smaller thickness.

As the circuit board is thinner, the board per se has lower rigidity, and thus, may be defective since it is bent at the time of mounting parts at a high temperature. For this reason, thermal expansion characteristics and heat resistance of a thermo-hardening polymer resin are important factors, and the structure of the polymer, the network among chains of the polymer resin constituting the board composition, and hardening density closely affect them at the time of thermal hardening.

Patent Document 1 discloses an epoxy resin composition containing a liquid crystal oligomer. However, the network between a hardener and a polymer resin is not sufficiently formed, and thus, does not sufficiently lower the coefficient of thermal expansion to a level appropriate for the printed circuit board and does not sufficiently raise the glass transition temperature.

Patent Document 1: Korean Patent Laid-Open Publication No. 2011-0108198

SUMMARY OF THE INVENTION

Accordingly, it was found that, with respect to an epoxy resin composition for a printed circuit board, an epoxy resin composition where a liquid crystal oligomer, preferably a liquid crystal oligomer having a specific structure and an amino triazine novolac hardener and products manufactured by using the same can exhibit improved coefficient of thermal expansion and excellent thermal property, and thus, the present invention was completed based on this.

The present invention has been made in an effort to provide an epoxy resin composition having a low coefficient of thermal expansion and an improved glass transition temperature.

Further, the present invention has been made in an effort to provide an insulating film having a low coefficient of thermal expansion and an improved glass transition temperature, which is manufactured from the epoxy resin composition.

Further, the present invention has been made in an effort to provide a prepreg where a substrate is impregnated with the epoxy resin composition, capable of having a low coefficient of thermal expansion and an improved glass transition temperature.

Further, the present invention has been made in an effort to provide a multilayer printed circuit board having the insulating film or the prepreg.

According to one preferred embodiment of the present invention, there is provided an epoxy resin composition for a printed circuit board, the epoxy resin composition including: a liquid crystal oligomer; an epoxy resin; and an amino triazine novolac hardener represented by Chemical Formula 1 below:

[Chemical Formula 1]

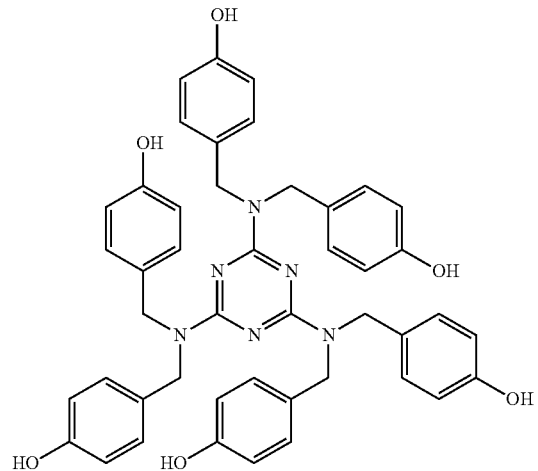

According to another preferred embodiment of the present invention, there is provided an epoxy resin composition for a printed circuit board, the epoxy resin composition including: a liquid crystal oligomer; an epoxy resin; an amino triazine novolac hardener represented by Chemical Formula 1 below; and an inorganic filler:

[Chemical Formula 1]

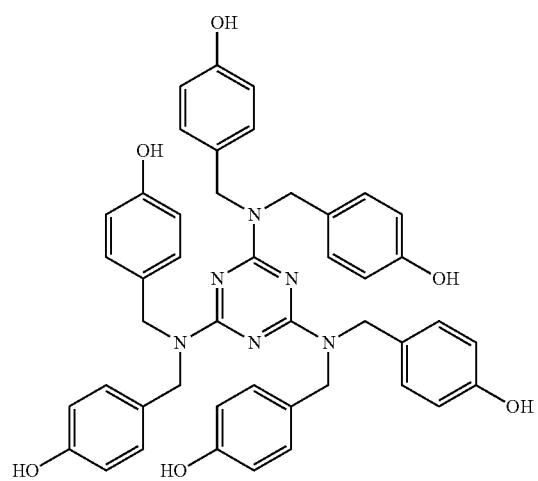

The liquid crystal oligomer may be represented by any one of Chemical Formulas 2 to 5:

[Chemical Formula 2]

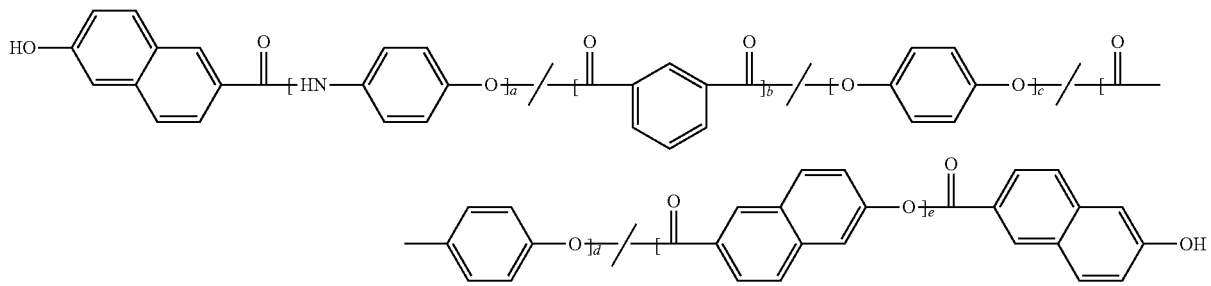

[Chemical Formula 3]

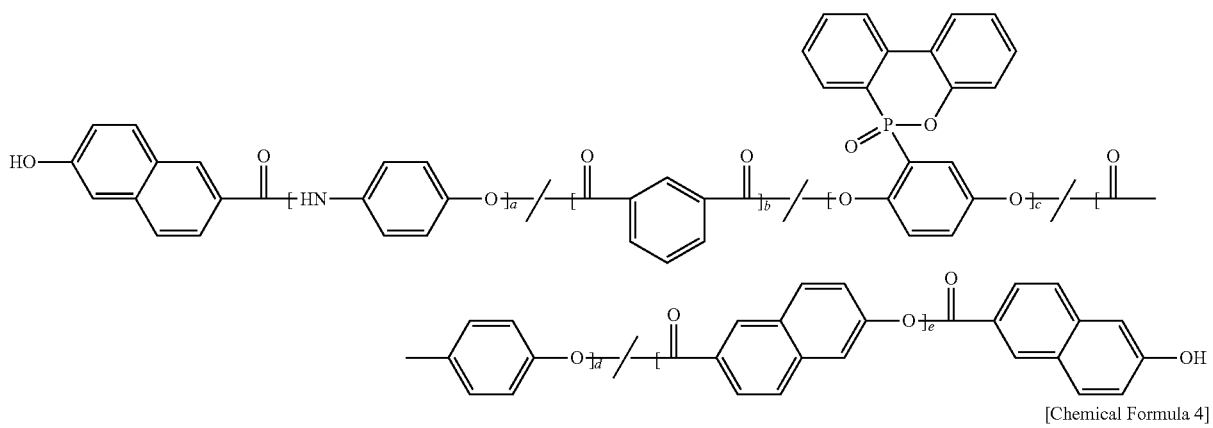

[Chemical Formula 4]

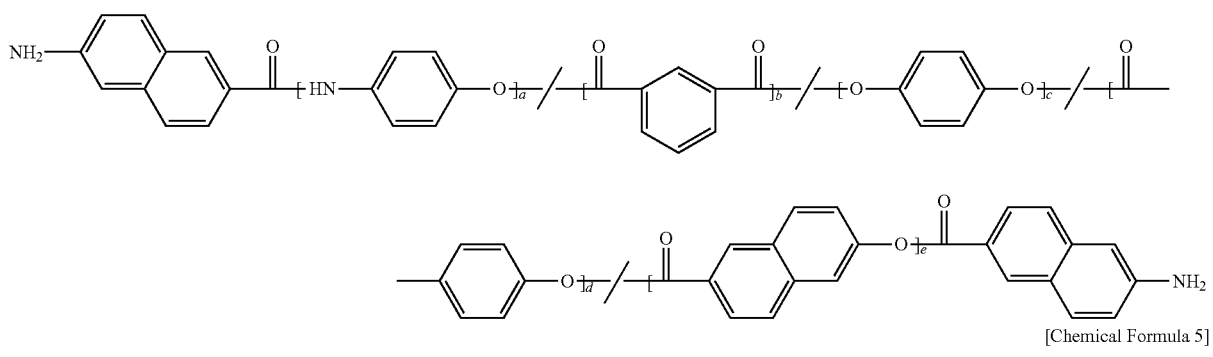

[Chemical Formula 5]

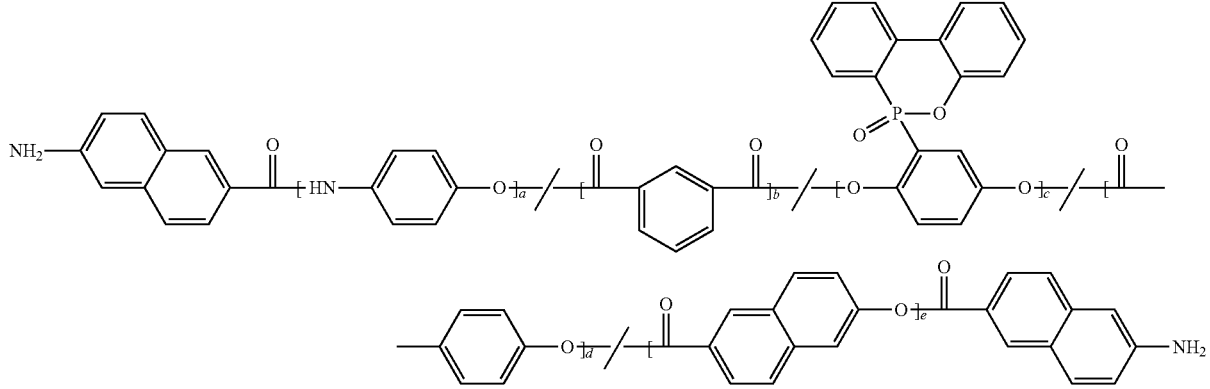

wherein in Chemical Formulas 2 to 5, a is an integer of 13~26; b is an integer of 13~26; c is an integer of 9~21; d is an integer of 10~30; and e is an integer of 10~30.

The epoxy resin composition may contain 39 to 60 wt % of the liquid crystal oligomer, 39 to 60 wt % of the epoxy resin, and 0.1 to 1 wt % of the amino triazine novolac hardener.

The epoxy resin composition may contain 9 to 30 wt % of the liquid crystal oligomer, 9 to 30 wt % of the epoxy resin, 0.01 to 0.5 wt % of the amino triazine novolac hardener, and 50 to 80 wt % of the inorganic filler.

The liquid crystal oligomer may have a number average molecular weight of 2,500 to 6,500.

The epoxy resin may be at least one selected from a naphthalene based epoxy resin, a bisphenol A type epoxy resin, a phenol novolac epoxy resin, a cresol novolac epoxy resin, a rubber-modified epoxy resin, and a phosphor based epoxy resin.

The epoxy resin may have four or more epoxy functional groups.

The inorganic filler may be at least one selected from the group consisting of silica, alumina, barium sulfate, talc, mud, a mica powder, aluminum hydroxide, magnesium hydroxide, calcium carbonate, magnesium carbonate, magnesium oxide, boron nitride, aluminum borate, barium titanate, calcium titanate, magnesium titanate, bismuth titanate, titan oxide, barium zirconate, and calcium zirconate.

The epoxy resin composition may further include at least one hardening accelerant selected from metal based hardening accelerants, imidazole based hardening accelerants, and amine based hardening accelerants.

The epoxy resin composition may further include at least one thermoplastic resin selected from a phenoxy resin, a polyimide resin, a polyamideimide (PAI) resin, a polyetherimide (PEI) resin, a polysulfone (PS) resin, a polyethersulfone (PES) resin, a polyphenylene ether (PPE) resin, a polycarbonate (PC) resin, a polyether ether ketone (PEEK) resin, and a polyester resin.

According to still another preferred embodiment of the present invention, there is provided an insulating film manufactured by using the epoxy resin composition as described above.

According to still another preferred embodiment of the present invention, there is provided a prepreg manufactured by impregnating a substrate with the epoxy resin composition as described above.

According to still another preferred embodiment of the present invention, there is provided a multilayer printed circuit board including the insulating film as described above.

According to still another preferred embodiment of the present invention, there is provided a multilayer printed circuit board including the prepreg as described above.

BRIEF DESCRIPTION OF THE DRAWINGS

The above and other objects, features and advantages of the present invention will be more clearly understood from the following detailed description taken in conjunction with the accompanying drawings, in which:

FIG. 1 is a cross-sectional view of a general printed circuit board to which an epoxy resin composition according to the present invention is applicable.

DESCRIPTION OF THE PREFERRED EMBODIMENTS

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a cross-sectional view of a general printed circuit board to which an epoxy resin composition according to the present invention is applicable. Referring to FIG. 1, a printed circuit board 100 may be an embedded substrate having electronic parts therein. Specifically, the printed circuit board 100 may include an insulator or prepreg 110 having a cavity, an electronic part 120 disposed inside the cavity, and a buildup layer 130 disposed on at least one of an upper surface and a lower surface of the insulator or prepreg 110 including the electronic part 120. The buildup layer 130 may include an insulating layer 131 disposed on at least one of the upper surface and the lower surface of the insulator 110 and a circuit layer 132 disposed on the insulating layer 131 to form an interlayer connection.

Here, an example of the electronic component 120 may be an active device such as a semiconductor device. In addition, the printed circuit board 100 may not have only one electronic part 120 therein but further have one or more additive electronic parts, such as a capacitor 140, a resistor element 150, and the like. In an exemplary embodiment of the present invention, the type or number of electronic parts is not limited. Here, the insulator or prepreg 110 and the insulating layer 131 may serve to insulate between circuit layers or between electronic parts, and also serve as a structural member for maintaining rigidity of a package.

Here, when wiring density of the printed circuit board 100 is increased, the insulator or prepreg 110 and the insulating layer 131 require a low dielectric permittivity characteristic in order to reduce noise between the circuit layers and parasitic capacitance, and the insulator or prepreg 110 and the insulating layer 131 also require a low dielectric loss characteristic in order to increase the insulating characteristics.

As such, at least one of the insulator or prepreg 110 and the insulating layer 131 needs to decrease the dielectric constant, the dielectric loss, and the like, and have rigidity. In the present invention, in order to secure rigidity by lowering the coefficient of thermal expansion of the insulating layer and raising the glass transition temperature, the insulating layer may be formed from an epoxy resin composition containing a liquid crystal oligomer, preferably a liquid crystal oligomer represented by any one of Chemical Formulas 2 to 5; an epoxy resin; and an amino triazine novolac hardener represented by Chemical Formula 1.

In addition, the insulating layer or prepreg may be formed from an epoxy resin composition containing a liquid crystal oligomer, preferably a liquid crystal oligomer represented by any one of Chemical Formulas 2 to 5; an epoxy resin; an amino triazine novolac hardener represented by Chemical Formula 1; and an inorganic filler.

[Chemical Formula 1]
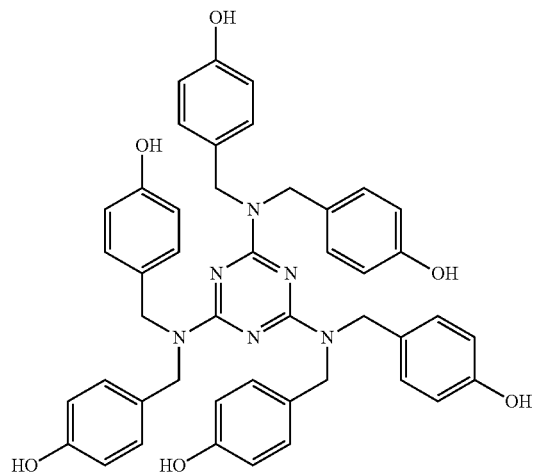
[Chemical Formula 2]
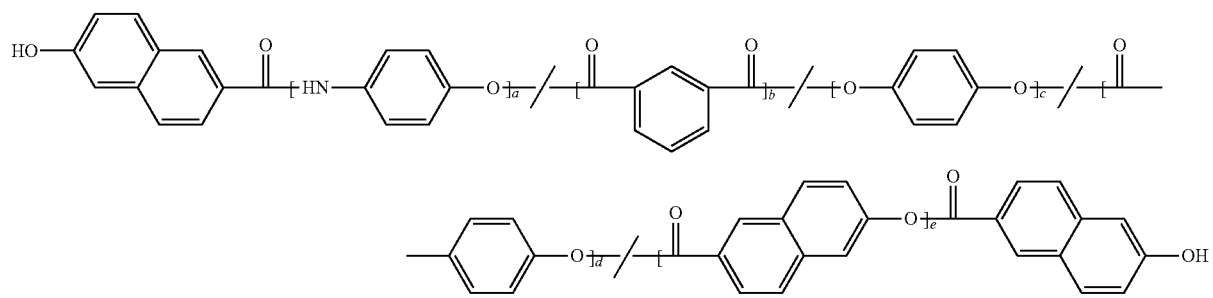
[Chemical Formula 3]
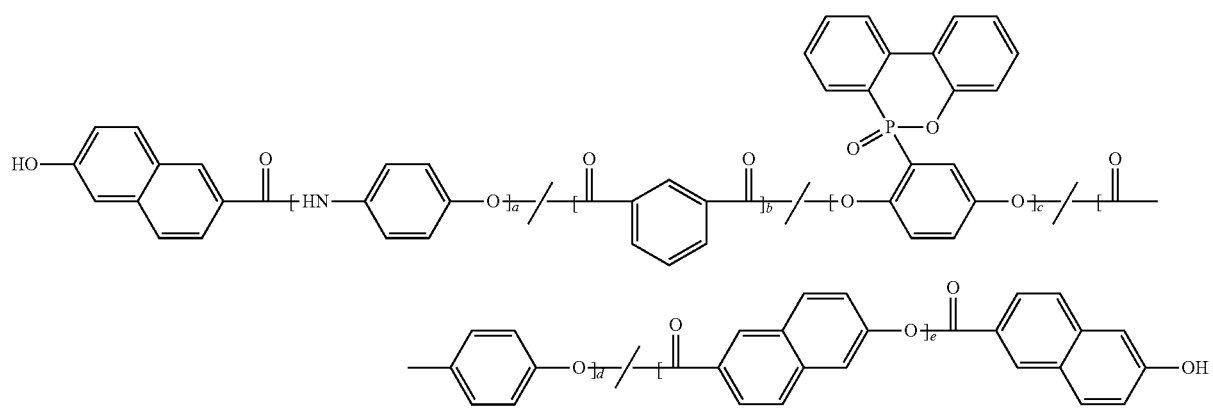
[Chemical Formula 4]
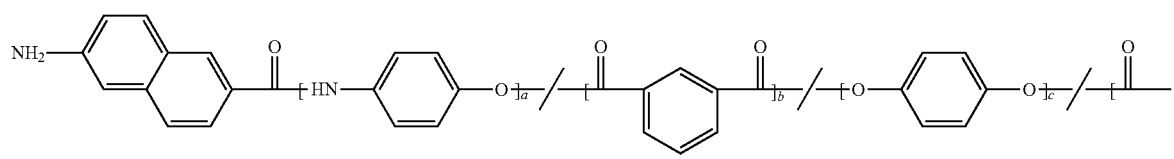
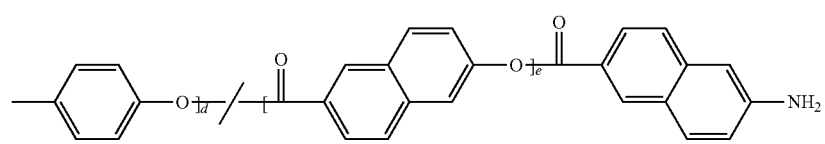

[Chemical Formula 5]

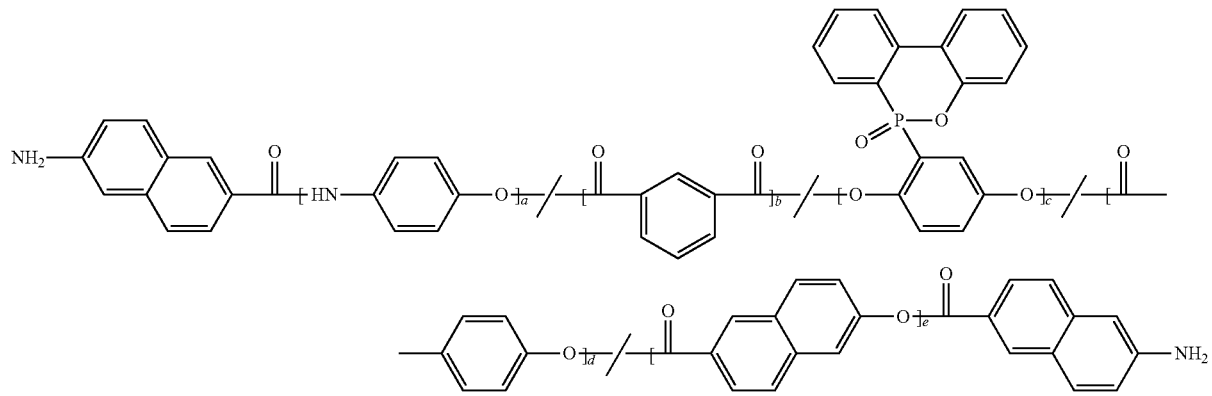

In Chemical Formulas 2 to 5, a is an integer of 13~26; b is an integer of 13~26; c is an integer of 9~21; d is an integer of 10~30; and e is an integer of 10~30.

Liquid Crystal Oligomer

A liquid crystal oligomer, preferably, a liquid crystal oligomer represented by any one of Chemical Formulas 2 to 5 may contain ester groups at both ends of a main chain in order to improve the dielectric dissipation factor and the dielectric constant; contain a naphthalene group for crystallinity; and contain a phosphorous component imparting flame retardancy.

The liquid crystal oligomer has a number average molecular weight of, preferably, 2,500 to 6,500 g/mol, more preferably, 3,000 to 6,000 g/mol, and still more preferably, 4,500 to 5,500. If the number average molecular weight of the liquid crystal oligomer is below 2,500 g/mol, mechanical properties may be deteriorated. If the number average molecular weight thereof is above 6,500 g/mol, solubility may be deteriorated.

In the case where an epoxy resin composition not containing an inorganic filler is prepared, the use amount of the liquid crystal oligomer is preferably 39 to 60 wt %, and more preferably 45 to 55 wt %. If the use amount thereof is below 39 wt %, the reduction in coefficient of thermal expansion and the improvement in glass transition temperature may be minimal. If the use amount thereof is above 60 wt %, mechanical properties may be deteriorated.

Whereas, in the case where an epoxy resin composition containing an inorganic filler is prepared, the use amount of the liquid crystal oligomer is preferably 9 to 30 wt %. If the use amount thereof is below 9 wt %, the reduction in coefficient of thermal expansion and the improvement in glass transition temperature may be minimal. If the use amount thereof is above 30 wt %, mechanical properties may be deteriorated.

Epoxy Resin

The resin composition according to the present invention may include an epoxy resin in order to improve handling property of the resin composition as an adhering film after drying. The epoxy resin means a material that contains, but is not particularly limited to, at least one epoxy group in a molecule thereof, and preferably at least two epoxy groups in a molecule thereof, and more preferably at least four epoxy groups in a molecule thereof.

As the epoxy resin used in the present invention, an epoxy resin containing a naphthalene group as shown in Chemical Formula 6 below or an aromatic amine type epoxy resin as shown in Chemical Formula 7 may be preferable.

[Chemical Formula 6]

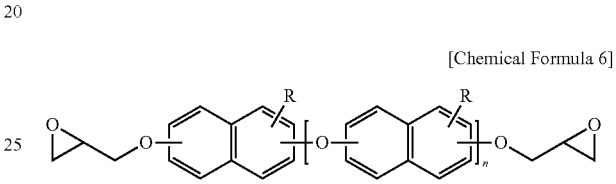

In Chemical Formula 6, R is C1~C20 alkyl and n is an integer of 0~20.

[Chemical Formula 7]

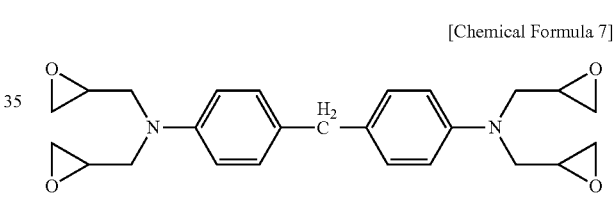

However, the epoxy resin used in the present invention is not particularly limited to the epoxy resin represented by Chemical Formula 6 or 7. Examples of the epoxy resin may include a bisphenol A epoxy resin, a bisphenol F epoxy resin, a bisphenol S epoxy resin, a phenol novolac epoxy resin, an alkylphenol novolac epoxy resin, a biphenyl epoxy resin, an aralkyl epoxy resin, a dicyclopentadiene epoxy resin, a naphthalene epoxy resin, a naphthol epoxy resin, an epoxy resin of a condensate of phenol and aromatic aldehyde having a phenolic hydroxyl group, a biphenylaralkyl epoxy resin, a fluorene epoxy resin, a xanthene epoxy resin, a triglycidyl isocianurate resin, a rubber modified epoxy resin, and a phosphorus based epoxy resin, and preferable are the naphthalene based epoxy resin, bisphenol A epoxy resin, phenol novolac epoxy resin, cresol novolac epoxy resin, rubber modified epoxy resin, and phosphorous based epoxy resin. One or two or more of epoxy resins may be mixed for use.

In the case where an epoxy resin composition not containing an inorganic filler is prepared, the use amount of the epoxy resin is preferably 39 to 60 wt %. If the use amount thereof is below 39 wt %, the handling property may be deteriorated. If the use amount thereof is above 60 wt %, the amount of other components added is relatively small, so that the dielectric dissipation factor, the dielectric constant, and the coefficient of thermal expansion may be little improved.

Whereas, in the case where an epoxy resin composition containing an inorganic filler is prepared, the use amount of the epoxy resin is preferably 9 to 30 wt %. If the use amount thereof is below 9 wt %, the handling property may be deteriorated. If the use amount thereof is above 30 wt %, the amount of other components added is relatively small, so that the dielectric dissipation factor, the dielectric constant, and the coefficient of thermal expansion may be little improved.

Amino Triazine Novolac Hardener

Meanwhile, the resin composition according to the present invention may include an amino triazine novolac hardener represented by Chemical Formula 1 in order to more improve the coefficient in thermal expansion and the thermal property.

[Chemical Formula 1]

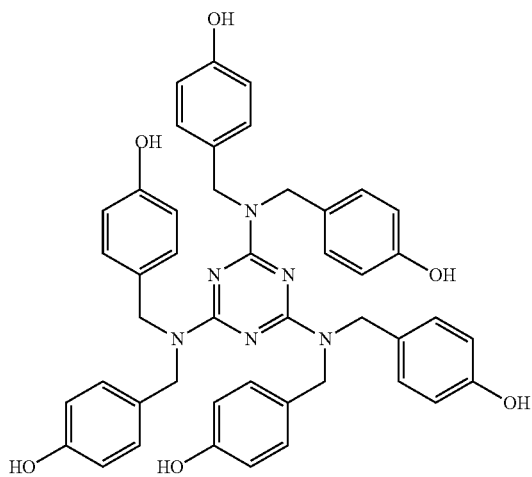

A hydroxy group of the amino triazine novolac hardener in the epoxy resin composition according to the present invention reacts with the epoxy group of the epoxy resin at the time of thermal hardening, to thereby constitute a network where the liquid crystal oligomer, the epoxy resin, and the amino triazine novolac hardener are interconnected with each other. That is, according to the present invention, among various hardeners, the amino triazine novolac hardener having excellent reactivity with the liquid crystal oligomer having a specific structure and the epoxy resin is selected to form an interconnected network, thereby lowering the coefficient of thermal expansion of the resin composition and exhibiting high heat resistance.

In the case where an epoxy resin composition not containing an inorganic filler is prepared, the use amount of the amino triazine novolac hardener is preferably 0.1 to 1 wt %. If the use amount thereof is below 0.1 wt %, the hardening rate may be decreased. If the use amount thereof is above 1 wt %, an unreacted hardener portion remains after the reaction, which may cause to an increase in the moisture absorption rate of an insulating film or prepreg, and thus, electrical properties may be deteriorated.

Whereas, in the case where an epoxy resin composition containing an inorganic filler is prepared, the use amount of the amino triazine hardener is preferably 0.01 to 0.5 wt %. If the use amount thereof is below 0.10 wt %, the hardening rate may be decreased. If the use amount thereof is above 0.5 wt %, an unreacted hardener portion remains after the reaction, which may cause to an increase in the moisture absorption rate of an insulating film or prepreg, and thus, electrical properties may be deteriorated.

Inorganic Filler

The epoxy resin composition according to the present invention contains an inorganic filler in order to lower the coefficient of thermal expansion (CTE) of the epoxy resin. The inorganic filler lowers the coefficient of thermal expansion, and the content thereof based on the resin composition is varied depending on characteristics requested in consideration of usage of the epoxy resin composition or the like, but is preferably 50 to 80 wt %. If the content thereof is below 50 wt %, the dielectric dissipation factor may be lowered and the coefficient of thermal expansion may be increased. If the content thereof is above 80 wt %, adhering strength may be deteriorated.

Specific examples of the inorganic filler used in the present invention may include silica, alumina, barium sulfate, talc, mud, a mica powder, aluminum hydroxide, magnesium hydroxide, calcium carbonate, magnesium carbonate, magnesium oxide, boron nitride, aluminum borate, barium titanate, calcium titanate, magnesium titanate, bismuth titanate, titan oxide, barium zirconate, calcium zirconate, and the like, which are used alone or in combination of two or more thereof. Particularly, preferable is silica having a low dielectric dissipation factor.

In addition, if the inorganic filler has an average particle size of 5 µm or larger, it is difficult to stably form a fine pattern when a circuit pattern is formed in a conductor layer. Hence, the average particle size of the inorganic filler is preferably 5 µm or less. In addition, the inorganic filler is preferably surface-treated with a surface treating agent such as a silane coupling agent, in order to improve the moisture resistance. More preferable is silica having a diameter of 0.2 to 2 µm.

Hardening Accelerant

The resin composition of the present invention can also perform efficient hardening by selectively including a hardening accelerant. Examples of the hardening accelerant used in the present invention may include a metal based hardening accelerant, an imidazole based hardening accelerant, an amine based hardening accelerant, and the like, and one or combination of two or more thereof may be added and used in a general amount used in the art.

Examples of the metal based hardening accelerant may include, but are not particularly limited to, an organic metal complex or organic metal salt of a metal, such as, cobalt, copper, zinc, iron, nickel, manganese, tin, or the like. Specific examples of the organic metal complex may include an organic cobalt complex such as cobalt (II) acetylacetonate, cobalt (III) acetylacetonate, and the like, an organic copper complex such as copper (II) acetylacetonate or the like, an organic zinc complex such as zinc (II) acetylacetonate or the like, an organic iron complex such as iron (III) acetylacetonate or the like, an organic nickel complex such as nickel (II) acetylacetonate or the like, and an organic manganese complex such as manganese (II) acetylacetonate or the like. Examples of the organic metal salt may include zinc octylate, tin octylate, zinc naphthenate, cobalt naphthenate, tin stearate, zinc stearate, and the like. As the metal based hardening accelerator, in view of hardening property and solvent solubility, preferable are cobalt (II) acetylacetonate, cobalt (III) acetylacetonate, zinc (II) acetylacetonate, zinc naphthenate, and iron (III) acetylacetonate, and more preferable are cobalt (II) acetylacetonate and zinc naphthenate. One kind or two or more kinds of metal based hardening accelerants may be used in combination.

Examples of the imidazole based hardening accelerant may include, but are not particularly limited to, an imidazole compound, such as, 2-methyl imidazole, 2-undecyl imidazole, 2-heptadecyl imidazole, 1,2-dimethyl imidazole, 2-ethyl-4-methyl imidazole, 1,2-dimethyl imidazole, 2-ethyl-4-methyl imidazole, 2-phenyl imidazole, 2-phenyl-4-methyl imidazole, 1-benzyl-2-methyl imidazole, 1-benzyl-2-phenyl imidazole, 1-cyanoethyl-2-methyl imidazole, 1-cyanoethyl-2-undecyl imidazole, 1-cyanoethyl-2-ethyl-4-methyl imidazole, 1-cyanoethyl-2-phenyl imidazole, 1-cyanoethyl-2-undencyl imidazolium trimellitate, 1-cyanoethyl-2-phenyl imidazolium trimellitate, 2,4-diamino-6-[2'-methyl imidazolyl-(1')]ethyl-s-triazine, 2,4-diamino-6-[2'-undecyl imidazolyl-(1')]-ethyl-s-triazine, 2,4-diamin-6-[2'-ethyl-4'-methyl imidazolyl-(1')]ethyl-s-triazine, 2,4-diamino-6-[2'-methyl imidazolyl-(1')]ethyl-s-triazine isocyanuric acid adduct, 2-phenyl imidazole isocyanuric acid adduct, 2-phenyl-4,5-dihydroxymethyl imidazole, 2-phenyl-4-methyl-5-hydroxy methyl imidazole, 2,3-dihydroxy-1H-pyrrolo[1,2-a]benzimidazole, 1-dodecyl-2-methyl-3-benzyl imidazolium chloride, 2-methyl imidazolin, 2-phenyl imidazolin, or the like, and an adduct body of the imidazole compound and an epoxy resin. One or two or more of imidazole hardening accelerants may be used in combination.

Examples of the amine based hardening accelerant may include, but are not particularly limited to, an amine compound, for example, trialkyl amine such as trimethylamine, tributylamine, or the like, 4-dimethylaminopyridine, benzyldimethyl amine, 2,4,6-tris(dimethylaminomethyl)phenol, 1,8-diazabicyclo(5,4,0)-undecene (hereinafter, referred to as DBU), or the like. One or two or more of amine based hardening accelerants may be used in combination.

Thermoplastic Resin

The resin composition of the present invention may selectively include a thermoplastic resin in order to improve film property thereof or improve mechanical property of the hardened material. Examples of the thermoplastic resin may include a phenoxy resin, a polyimide resin, a polyamideimide (PAI) resin, a polyetherimide (PEI) resin, a polysulfone (PS) resin, a polyethersulfone (PES) resin, a polyphenyleneether (PPE) resin, a polycarbonate (PC) resin, a polyetheretherketone (PEEK) resin, a polyester resin, and the like. These thermoplastic resins may be used alone or in mixture of two or more. The average weight molecular weight of the thermoplastic resin is preferably within a range of 5,000 to 200,000. If the average weight molecular weight thereof is below 5,000, effects of improving film formability and mechanical strength are not sufficiently exhibited. If the average weight molecular weight thereof is above 200,000, compatibility with the liquid crystal oligomer and the epoxy resin is not sufficient; the surface unevenness after hardening becomes larger; and high-density fine wiring patterns are difficult to form. The average weight molecular weight is measured at a column temperature of 40° C. by using, specifically, LC-9A/RID-6A by the Shimadzu Corporation as a measuring apparatus, Shodex K-800P/K-804L/K-804L by the Showa Denko Company as a column, and chloroform ($CHCl_3$) as a mobile phase, and then calculated by using a calibration curve of standard polystyrene.

In the case where a thermoplastic resin is blended with the resin composition of the present invention, the content of thermoplastic resin in the resin composition is, but is not particularly limited to, preferably 0.1 to 10 wt %, and more preferably 1 to 5 wt %, based on 100 wt % of non-volatile matter in the resin composition. If the content of thermoplastic resin is below 0.1 wt %, an improving effect of film formability or mechanical strength is not exhibited. If the content thereof is above 10 wt %, molten viscosity may tend to be increased and surface roughness of an insulating layer after a wet roughening process may tend to be increased.

The insulating resin composition according to the present invention is mixed in the presence of an organic solvent. Examples of the organic solvent, considering solubility and miscibility of the resin and other additives used in the present invention, may include 2-methoxy ethanol, acetone, methyl ethyl ketone, cyclohexanone, ethyl acetate, butyl acetate, cellosolve acetate, propylene glycol monomethyl ether acetate, ethylene glycol monobutyl ether acetate, cellosolve, butyl cellosolve, carbitol, butyl carbitol, xylene, dimethyl formamide, and dimethyl acetamide, but are not particularly limited thereto.

The viscosity of the epoxy resin composition according to the present invention is preferably 1000 to 2000 cps in the case where the inorganic filler is not contained, and preferably 700 to 1500 cps in the case where the inorganic filler is contained, and this viscosity is suitable for manufacturing the insulating film and allows appropriate adhesive property at the normal temperature. The viscosity of the epoxy resin composition may be controlled by varying the content of the solvent. Other non-volatile components excluding the solvent account for 30 to 70 wt % based on the epoxy resin composition. If the viscosity of the epoxy resin composition is out of the above range, it is difficult to form the insulating film, or it is difficult to mold a member even with the insulating film.

In addition, the peeling strength in an insulating film state exhibits 1.0 kN/m or greater when 12 μm of copper foil is used. The insulating film manufactured by using the epoxy resin according to the present invention has a coefficient of thermal expansion (CTE) of 5 to 50 ppm/° C., and preferably 15 to 45 ppm/° C. in the case where the insulating film does not contain the inorganic filler. In addition, the glass transition temperature (Tg) thereof may be 200 to 300° C., and preferably 210 to 270° C.

In addition, the present invention may further include, as necessary, other known leveling agents and/or flame retardants by those skilled in the art within the technical scope of the present invention.

The insulating resin composition of the present invention may be manufactured into a semisolid-phase dry film by any general method known in the art. For example, the resin composition is manufactured into a film by using a roll coater, a curtain coater, or the like, and then dried. Then, the film is applied onto a substrate, to thereby be used as an insulating layer (or an insulating film) or prepreg when the multilayer printed circuit board is manufactured in a build-up manner. This insulating film or prepreg has a low coefficient of thermal expansion (CTE) of 50 ppm/° C. or lower.

As such, the prepreg is prepared by impregnating a substrate such as a glass fiber or the like with the epoxy resin composition according to the present invention, followed by hardening, and then a copper foil is laminated thereon, thereby obtaining a copper clad laminate (CCL). In addition, the insulating films manufactured by using the epoxy resin composition of the present invention are laminated on a copper clad laminate (CCL) used as an inner layer, at the time of manufacturing the multilayer printed circuit board. For example, the multilayer printed circuit board may be manufactured by laminating the insulating films formed of the insulating resin composition on a patterned inner layer circuit board; hardening it at a temperature of 80 to 110° C. for 20 to 30 minutes; performing a desmear process, and then forming a circuit layer through an electroplating process.

Hereinafter, the present invention will be described in more detail with reference to the following examples and comparative examples, but the scope of the present invention is not limited thereto.

PREPARATIVE EXAMPLE 1

Preparation of Liquid Crystal Oligomer 4-aminophenol 218.26 g (2.0 mol), isophthalic acid 415.33 g (2.5 mol), 4-hydroxybenzoic acid 276.24 g (2.0 mol), 6-hydroxy-2-naphthoic acid 282.27 g (1.5 mol), 9,10-dihydroxy-9-oxa-10-phosphaphenanthrene-10-oxide (DOPO) 648.54 g (2.0 mol), and acetic acid anhydride 1531.35 g (15.0 mol) were put in a 20 L-glass reactor. The inside of the reactor was sufficiently replaced with nitrogen gas, and then the temperature of the reactor was raised to 230° C. under the flow of the nitrogen gas. While the inner temperature of the reactor was maintained at that temperature, reflux was conducted for 4 hours. 6-Hydroxy-2-naphthoic acid for end capping 188.18 g (1.0 mol) was further added, and then acetic acid, which is a reaction byproduct, and unreacted acetic acid anhydride were removed, to thereby prepare a liquid crystal oligomer represented by Chemical Formula 3 below, having a molecular weight of about 4500.

EXAMPLE 1

A silica slurry having a concentration of 70 wt % was prepared by dispersing 1400 g of silica having a size distribution of an average particle size of 0.2 to 1 µm in 2-methoxy ethanol. After that, 500 g of bisphenol F based four-functional group epoxy (N,N,N',N'-tetraglycidyl-4,4'-methylenebisbenzenamine) having an average epoxy equivalent of 100 to 300 was added to the prepared silica slurry, and then they were stirred at 300 rpm and dissolved at room temperature, thereby preparing a mixture. After that, 5 g of the amino triazine novolac hardener represented by Chemical Formula 1 and 500 g of the liquid crystal oligomer prepared from Preparative Example 1, which was dissolved in dimethylacetamide, were added to the mixture, followed by further stirring at 300 rpm for 1 hour, thereby preparing an epoxy resin composition. This was coated on a shiny surface of copper foil to have a thickness of 100 µm by a doctor blade method, thereby manufacturing a film. The film was dried at room temperature for 2 hours, and dried in a vacuum oven at 80° C. for 1 hour, and then again dried at 110° C. for 1 hour, to thereby become in a B-stage. This was completely hardened by using vacuum press. Here, the maximum temperature was 230° C. and the maximum pressure was 2 MPa.

COMPARATIVE EXAMPLE 1

A silica slurry having a concentration of 70 wt % was prepared by dispersing 1400 g of silica having a size distribution of an average particle size of 0.2 to 1 µm in 2-methoxy ethanol. After that, 500 g of bisphenol F based four-functional group epoxy (N,N,N',N'-tetraglycidyl-4,4'-methylenebisbenzenamine) having an average epoxy equivalent of 100 to 300 was added to the prepared silica slurry, and then they were stirred at 300 rpm and dissolved at room temperature, thereby preparing a mixture. After that, 5 g of the dicyandiamide hardener and 500 g of the liquid crystal oligomer prepared from Preparative Example 1, which was dissolved in dimethylacetamide, were added to the mixture, followed by further stirring at 300 rpm for 1 hour, thereby preparing an epoxy resin composition. This was coated on a shiny surface of copper foil to have a thickness of 100 µm by a doctor blade method, thereby manufacturing a film. The film was dried at room temperature for 2 hours, and dried in a vacuum oven at 80° C. for 1 hour, and then again dried at 110° C. for 1 hour, to thereby become in a B-stage. This was completely hardened by using vacuum press. Here, the maximum temperature was 230° C. and the maximum pressure was 2 MPa.

COMPARATIVE EXAMPLE 2

A silica slurry having a concentration of 70 wt % was prepared by dispersing 1400 g of silica having a size distribution of an average particle size of 0.2 to 1 µm in 2-methoxy ethanol. After that, 500 g of bisphenol F based four-functional group epoxy (N,N,N',N'-tetraglycidyl-4,4'-methylenebisbenzenamine) having an average epoxy equivalent of 100 to 300 was added to the prepared silica slurry, and then they were stirred at 300 rpm and dissolved at room temperature, thereby preparing a mixture. After that, 5 g of the amino triazine novolac hardener represented by Chemical Formula 1 was added to the mixture, followed by further stirring at 300 rpm for 1 hour, thereby preparing an epoxy resin composition. This was coated on a shiny surface of copper foil to have a thickness of 100 µm by a doctor blade method, thereby manufacturing a film. The film was dried at room temperature for 2 hours, and dried in a vacuum oven at 80° C. for 1 hour, and then again dried at 110° C. for 1 hour, to thereby become in a B-stage. This was completely hardened by using vacuum press. Here, the maximum temperature was 230° C. and the maximum pressure was 2 MPa.

Evaluation on Thermal Property

The coefficient of thermal expansion (CTE) of each sample of the insulating films manufactured according to Example 1 and Comparative Examples 1 and 2 was measured by using a thermomechanical analyzer (TMA). The glass transition temperature (Tg) was measured by a differential scanning calorimeter (DSC) while the temperature of a heat analyzer (TMA 2940, TA Instruments) was raised to 270° C. (first cycle) and 300° C. (second cycle) at a temperature rising rate of 10° C./min in nitrogen atmosphere, and the results were tabulated in Table 1 below.

Evaluation on Peeling Strength of Copper Foil

The peeling strength was measured by using a tensile strength measuring instrument (Universe Testing Machine (UTM)/KTW100) after peeling a copper foil having a width of 1 cm from a surface of a copper clad laminate, and the results were shown in Table 1 below (90° peeling test, cross head rate: 50 mm/min).

TABLE 1

| | Coefficient of Thermal Expansion (ppm/° C.) | Glass Transition Temperature (° C.) | Peeling Strength (T) (kN/m) |
| --- | --- | --- | --- |
| Example 1 | 46.8 | 219 | 1.05 |
| Comparative Example 1 | 54.8 | 205 | 0.92 |
| Comparative Example 2 | 65.0 | 170 | 0.91 |

It can be seen from Table 1 above that the insulating films according to example 1 using the amino triazine novolac hardener had a lower coefficient of thermal expansion (CTE) and a higher glass transition temperature (Tg) as compared with the insulating film according to Comparative Example 1 using the dicyandiamide hardener. The peeling strength was also improved. In addition, it can be seen that the insulating film according to Example 1 had more improved thermal property as compared with the insulating film according to Comparative Example 2 using the amino triazine novolac hardener except for the liquid crystal oligomer.

As set forth above, the epoxy resin composition for a printed circuit board and the insulating film and the prepreg manufactured therefrom according to the present invention can have a low coefficient of thermal expansion, excellent heat resistance, and a high glass transition temperature.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An epoxy resin composition for a printed circuit board, the epoxy resin composition comprising:
   a liquid crystal oligomer;
   an epoxy resin; and
   an amino triazine novolac hardener represented by Chemical Formula 1 below:

[Chemical Formula 1]

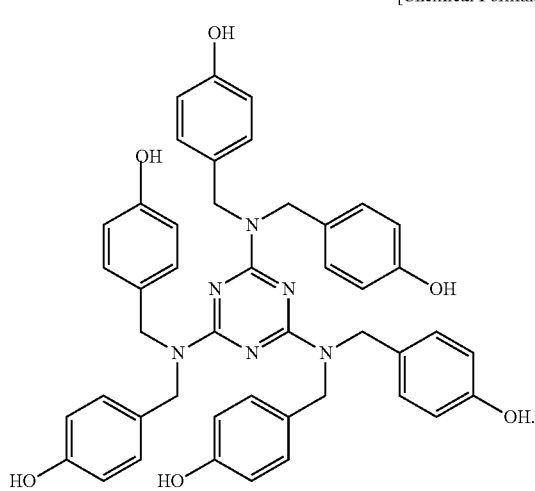

2. An epoxy resin composition for a printed circuit board, the epoxy resin composition comprising:
   a liquid crystal oligomer;
   an epoxy resin;
   an amino triazine novolac hardener represented by Chemical Formula 1 below; and
   an inorganic filler:

[Chemical Formula 1]

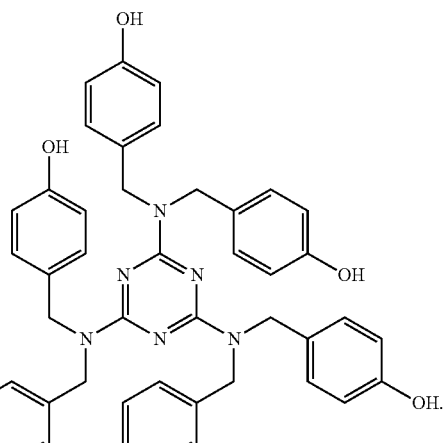

3. The epoxy resin composition as set forth in claim 1, wherein the liquid crystal oligomer is represented by any one of Chemical Formulas 2 to 5:

[Chemical Formula 2]

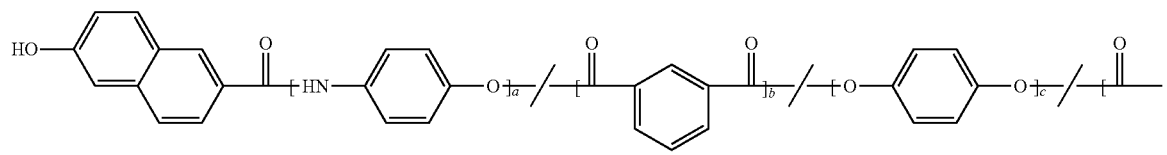

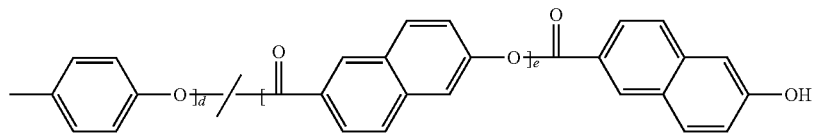

[Chemical Formula 3]
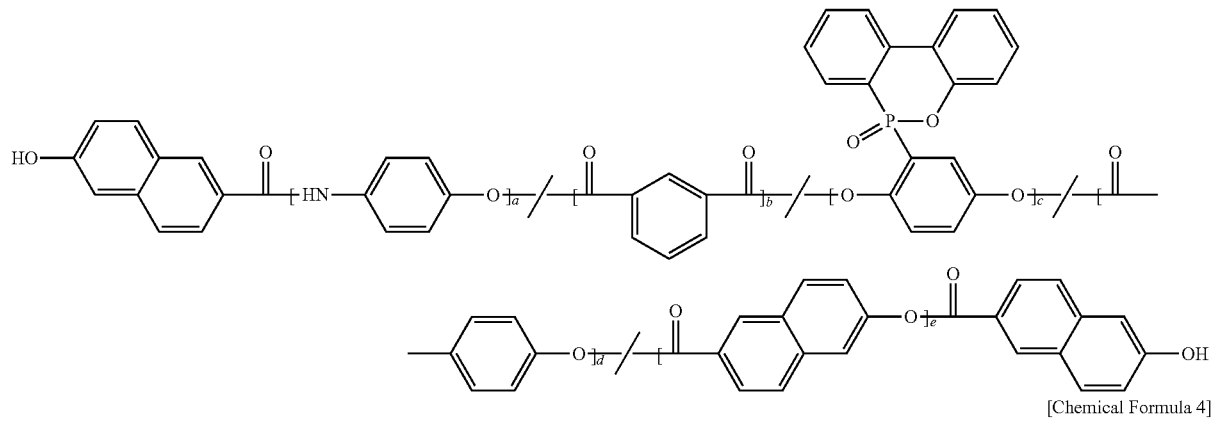
[Chemical Formula 4]
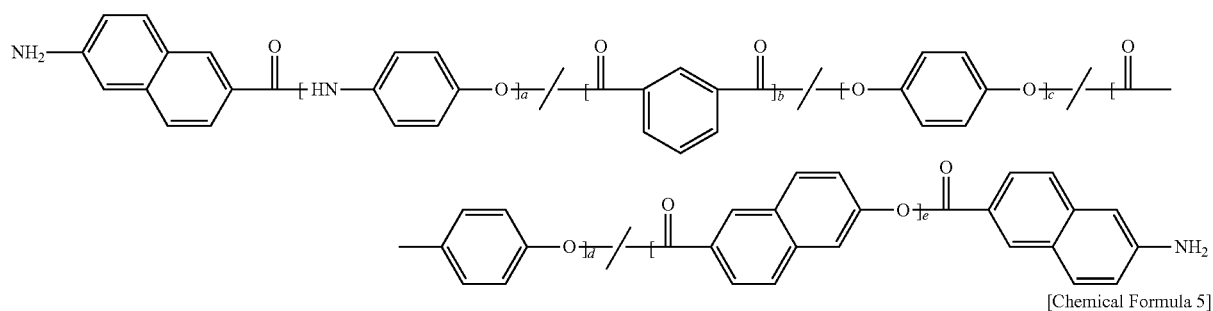
[Chemical Formula 5]
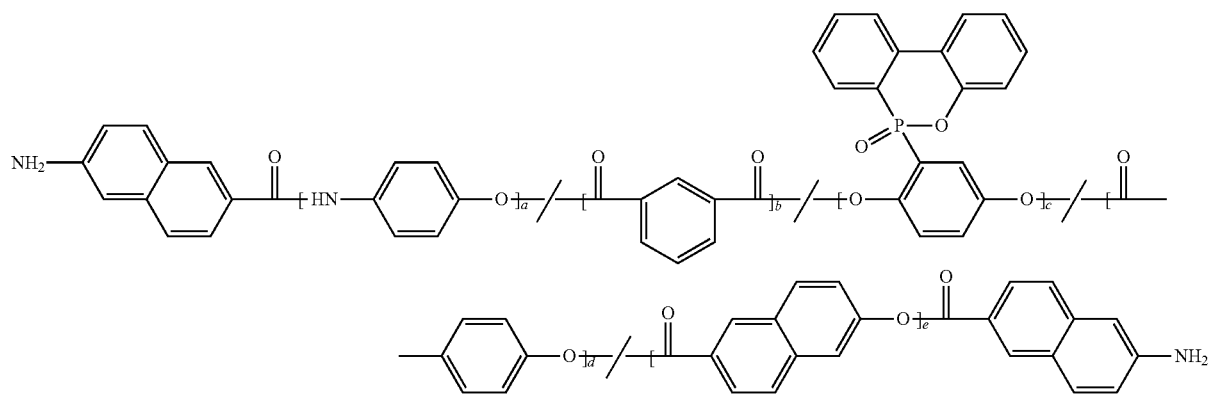
wherein in Chemical Formulas 2 to 5, a is an integer of 13~26; b is an integer of 13~26; c is an integer of 9~21; d is an integer of 10~30; and e is an integer of 10~30.
4. The epoxy resin composition as set forth in claim 2, wherein the liquid crystal oligomer is represented by any one of Chemical Formulas 2 to 5:
[Chemical Formula 2]
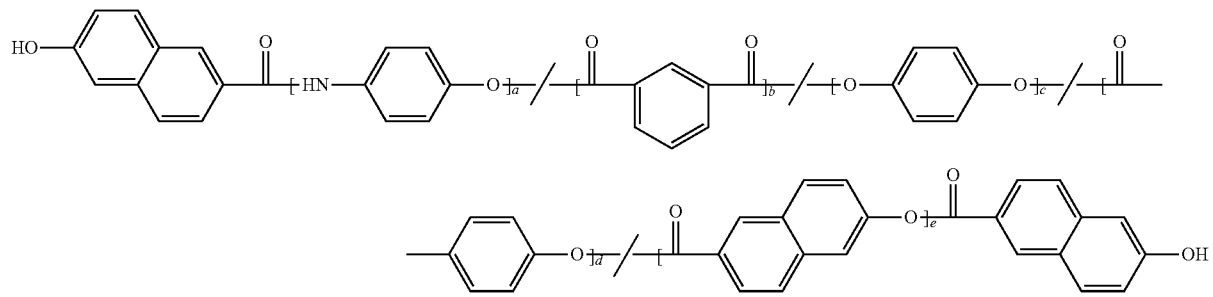

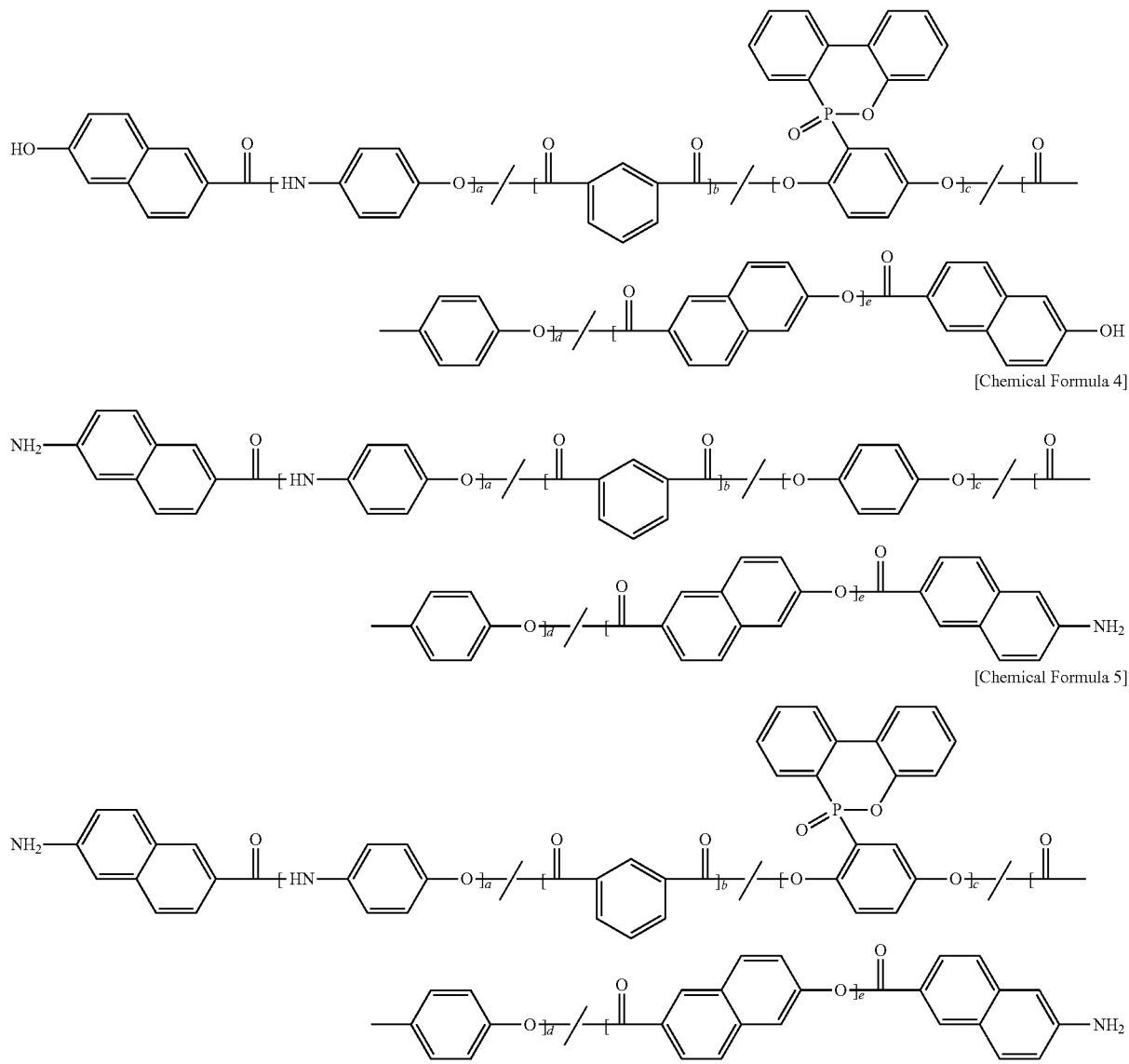

wherein in Chemical Formulas 2 to 5, a is an integer of 13~26; b is an integer of 13~26; c is an integer of 9~21; d is an integer of 10~30; and e is an integer of 10~30.

5. The epoxy resin composition as set forth in claim 1, wherein it contains 39 to 60 wt % of the liquid crystal oligomer, 39 to 60 wt % of the epoxy resin, and 0.1 to 1 wt % of the amino triazine novolac hardener.

6. The epoxy resin composition as set forth in claim 2, wherein it contains 9 to 30 wt % of the liquid crystal oligomer, 9 to 30 wt % of the epoxy resin, 0.01 to 0.5 wt % of the amino triazine novolac hardener, and 50 to 80 wt % of the inorganic filler.

7. The epoxy resin composition as set forth in claim 1, wherein the liquid crystal oligomer has a number average molecular weight of 2,500 to 6,500.

8. The epoxy resin composition as set forth in claim 2, wherein the liquid crystal oligomer has a number average molecular weight of 2,500 to 6,500.

9. The epoxy resin composition as set forth in claim 1, wherein the epoxy resin is at least one selected from a naphthalene based epoxy resin, a bisphenol A epoxy resin, a phenol novolac epoxy resin, a cresol novolac epoxy resin, a rubber-modified epoxy resin, and a phosphor based epoxy resin.

10. The epoxy resin composition as set forth in claim 2, wherein the epoxy resin is at least one selected from a naphthalene based epoxy resin, a bisphenol A epoxy resin, a phenol novolac epoxy resin, a cresol novolac epoxy resin, a rubber-modified epoxy resin, and a phosphor based epoxy resin.

11. The epoxy resin composition as set forth in claim 1, wherein the epoxy resin has four or more epoxy functional groups.

12. The epoxy resin composition as set forth in claim 2, wherein the epoxy resin has four or more epoxy functional groups.

13. The epoxy resin composition as set forth in claim 2, wherein the inorganic filler is at least one selected from the group consisting of silica, alumina, barium sulfate, talc, mud, a mica powder, aluminum hydroxide, magnesium hydroxide, calcium carbonate, magnesium carbonate, magnesium oxide, boron nitride, aluminum borate, barium titanate, calcium titanate, magnesium titanate, bismuth titanate, titan oxide, barium zirconate, and calcium zirconate.

14. The epoxy resin composition as set forth in claim 1, further comprising at least one hardening accelerant selected from metal based hardening accelerants, imidazole based hardening accelerants, and amine based hardening accelerants.

15. The epoxy resin composition as set forth in claim 2, further comprising at least one hardening accelerant selected from metal based hardening accelerants, imidazole based hardening accelerants, and amine based hardening accelerants.

16. The epoxy resin composition as set forth in claim 1, further comprising at least one thermoplastic resin selected from a phenoxy resin, a polyimide resin, a polyamideimide (PAI) resin, a polyetherimide (PEI) resin, a polysulfone (PS) resin, a polyethersulfone (PES) resin, a polyphenylene ether (PPE) resin, a polycarbonate (PC) resin, a polyether ether ketone (PEEK) resin, and a polyester resin.

17. The epoxy resin composition as set forth in claim 2, further comprising at least one thermoplastic resin selected from a phenoxy resin, a polyimide resin, a polyamideimide (PAI) resin, a polyetherimide (PEI) resin, a polysulfone (PS) resin, a polyethersulfone (PES) resin, a polyphenylene ether (PPE) resin, a polycarbonate (PC) resin, a polyether ether ketone (PEEK) resin, and a polyester resin.

18. An insulating film manufactured by using the epoxy resin composition as set forth in claim 1.

19. A prepreg manufactured by impregnating a substrate with the epoxy resin composition as set forth in claim 1.

20. A multilayer printed circuit board comprising the insulating film as set forth in claim 18.

21. A multilayer printed circuit board comprising the insulating film as set forth in claim 19.

\* \* \* \* \*